United States Patent [19]

Leban et al.

[11] Patent Number: 4,988,065

[45] Date of Patent: Jan. 29, 1991

[54] MOUNTING DEVICE FOR ORNAMENTAL OBJECT

[75] Inventors: Michael F. Leban, Norfolk; John M. Giordano, Virginia Beach, both of Va.

[73] Assignee: Signatures, Inc., Norfolk, Va.

[21] Appl. No.: 377,660

[22] Filed: Jul. 10, 1989

[51] Int. Cl.5 ........................ B60R 27/00; F16M 11/14
[52] U.S. Cl. ........................................ 248/181; 248/624
[58] Field of Search ............... 248/181, 288.3, 483, 248/624

[56] References Cited

U.S. PATENT DOCUMENTS

| | | | |
|---|---|---|---|
| 1,070,278 | 8/1913 | McKinney | 248/160 |
| 1,755,228 | 4/1930 | Stoll | 248/583 |
| 2,121,525 | 6/1938 | Johnson | 248/43 |
| 2,724,996 | 11/1955 | O'Shei | 88/98 |
| 2,859,983 | 11/1958 | May | 248/288.3 |
| 2,910,260 | 10/1959 | Tanner | 248/181 |
| 2,971,436 | 2/1961 | Smith | 248/483 |
| 2,978,217 | 4/1961 | Gunderson | 248/204 |
| 3,433,280 | 4/1969 | McCabe | 74/501 |
| 3,588,016 | 6/1971 | Reinhard et al. | 248/204 |
| 3,813,113 | 5/1974 | Burnham | 280/150 R |
| 4,066,231 | 1/1978 | Bahner | 248/288.3 |
| 4,067,528 | 1/1978 | Motting et al. | 248/204 |
| 4,770,382 | 9/1988 | Lehti | 248/181 |

*Primary Examiner*—Reinaldo P. Machado
*Attorney, Agent, or Firm*—McDermott, Will & Emery

[57] ABSTRACT

A device for mounting an ornamental object to a surface of vehicles. The device includes a ball attached to the ornamental object. The ball is received by a socket means and resilient retaining means act to fixably mount the ornament in one of a plurality of positions. The device is thereby adapted to be used on a variety of vehicles having a variety of hood slope angles.

24 Claims, 3 Drawing Sheets

MOUNTING DEVICE FOR ORNAMENTAL OBJECT

BACKGROUND OF THE INVENTION

This invention relates to devices for mounting an ornamental object to a surface, particularly devices for mounting hood ornaments to a surface of a vehicle.

Ornaments on the hoods of automobiles have been well known since the beginning of the automotive industry. They have been used primarily by automobile manufacturers to identify and advertise either the model of the automobile or the manufacturer. As such, they identify the vehicle with the manufacturer, not with the owner. They are usually designed specifically for the automobile on which they are installed by the manufacturer as original equipment manufacturer (O.E.M.) components. They are replaceable, if damaged, but not changeable for variation. They are limited to the single specific ornament designed for a particular model or manufacturer. Therefore, there has been no opportunity for the consumer to utilize the hood ornament of his choice to personalize his vehicle.

Due to the limited variation of hood ornaments provided by manufacturers, a need has developed for custom hood ornaments. A custom ornament conveys a message to the public which can represent an image of importance to the consumer, an interest or hobby of the consumer, or a distinctive identification of the consumer's vehicle. In addition, custom hood ornaments can come in a variety of shapes and sizes and often reflect the pride a vehicle owner has in his vehicle and the presentation of images of importance to him. Such custom ornaments have been manufactured and marketed for years but have no enjoyed widespread use because of design and functional limitations in their mounting devices.

Typically, there are two kinds of custom ornament mounting devices, specifically, those that bolt the ornament to the hood and those with springs below the hood surface. The bolting device does not move on impact and, therefore, injury and property damage are possible. The spring mounting device permits the ornament to move on impact, and thus provides some degree of safety. Prior art hood ornament mounting devices are limited in that they are not adaptable for variation in hood slope angles. Such prior art mounting devices fix the angle of inclination of the hood ornament relative to its attached base, not the slope of the vehicle onto which it is to be affixed. As stated previously, some prior art mounting devices will move on impact. However, such mounting devices resiliently return to their original mounting position after such impact.

Because prior art hood ornaments fix the mounting inclination of a hood ornament, they are not adapted to be used on a variety of automobiles with varying hood slope angles. Typically, in order to Provide an aesthetically pleasing presentation of a hood ornament, the ornament must have a substantially vertical orientation with respect to the surface on which the automobile rides. Thus, a consumer is faced with the dilemma of choosing a desired ornament that may or may not accommodate the hood slope angle of his vehicle to provide a substantially vertical presentation of the ornament with respect to the road. In addition, if the consumer buys a new vehicle with a different hood slope angle, a new mounting device, if one exists or is otherwise obtainable, must be purchased.

An additional problem encountered in the prior art is that existing O.E.M. hood ornament mounting devices are not adaptable for retrofitting replacement of O.E.M. ornaments with custom hood ornaments, thus forcing the consumer to install his own mounting device for a custom hood ornament. Further difficulties have arisen, though, as O.E.M. mounting devices include portions which are affixed to a vehicle hood such that removal would damage or mar the surface of the hood. Consequently, a potential consumer for a custom hood ornament is dissuaded from purchasing such a product.

A further problem with prior art mounting devices is that, on spring mounting devices, the hood ornament is installed via steps performed on the exterior of the hood. The hood ornament is attached to a spring loaded clip which extends through an opening in the hood to the exterior. Since the attachment steps are all performed on the exterior of the hood, it is very easy for a thief to perform those same steps in reverse. Therefore, the hood ornament is susceptible to theft.

SUMMARY OF THE INVENTION

The invention is directed to a device for mounting an ornamental object to a panel of a vehicle. The mounting device includes a ball attached to the ornamental object and socket means for receiving the ball. The socket means is mounted on the panel. The device further includes means for resiliently retaining the ball in the socket means. In this manner, the ornamental object may be mounted in a plurality of positions.

Accordingly, an object of the present invention is to permit the consumer to utilize a variety of customized hood ornaments attachable with a universal base allowing for safe, widespread use on any vehicle.

Another object of the invention is to provide a pivoting action at the universal base which permits varying the angle of the ornament when mounted on any vehicle so that the ornament always stands upright.

Yet another object of the invention is to provide a universal base for mounting on vehicles with flat hoods or varying hood center ridge angles by the use of differing, flexible, shaped gasket bushings.

A further object of the invention is to allow for installation of an ornament as a retrofitting replacement of an O.E.M. ornament by means of a universally mountable gasket bushing.

An additional object of the invention is to Provide a universal base for mounting an ornament on different areas of a vehicle, including, but not limited to, a hood.

An advantage of the invention is that an universal base is provided which firmly grips the ornament in a plurality of directions.

Yet another advantage of the invention is the prevention of dirt from collecting in and moisture from leaking into the hood due to the opening created in the hood for mounting the universal base.

An additional advantage of the invention is the use of a universal base to allow for the interchangeability of ornaments.

Another advantage of the invention is variable tension control on an ornament mounting assembly.

A further advantage of the invention is to allow an ornament to be easily mounted, but difficult to remove, thus preventing theft.

Still another advantage of the invention is that an ornament may be mounted on a hood in a spring loaded, pivotally upright position which, upon impact, yields in the direction of the impact, thus preventing injury to persons who may impact the ornament.

DETAILED DESCRIPTION OF THE PRESENTLY PREFERRED EMBODIMENTS

Figure 1:
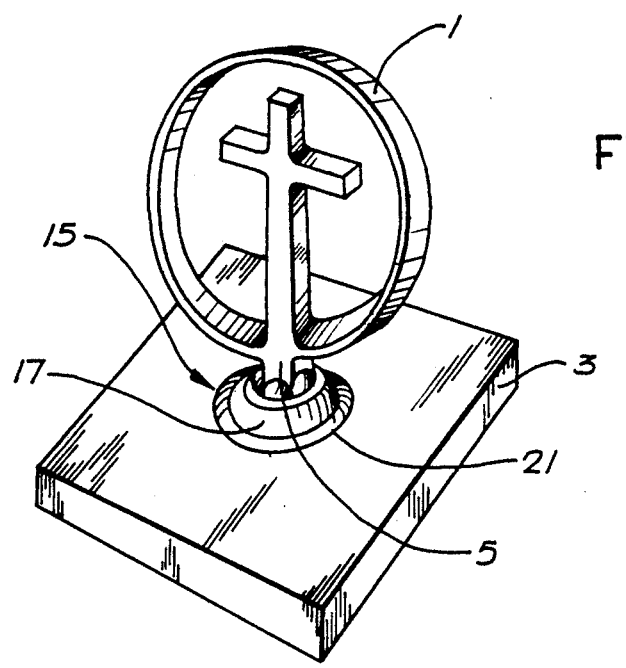
FIG. 1 is a perspective view of an embodiment of the invention used to mount an ornament on a hood of a vehicle.

Referring now to the drawings, FIG. 1 shows an embodiment of the present invention used to mount an ornamental object 1 on an exterior surface of a panel 3 of a vehicle. Preferably, the vehicle is a motorized vehicle such as an automobile, truck, van, recreational vehicle, motorcycle or watercraft. However, other vehicles may be used, such as bicycles, scooters, snowmobiles or boats. Preferably, the panel 3 is the hood of a vehicle, but any panel having a surface may be used.

Figure 2:
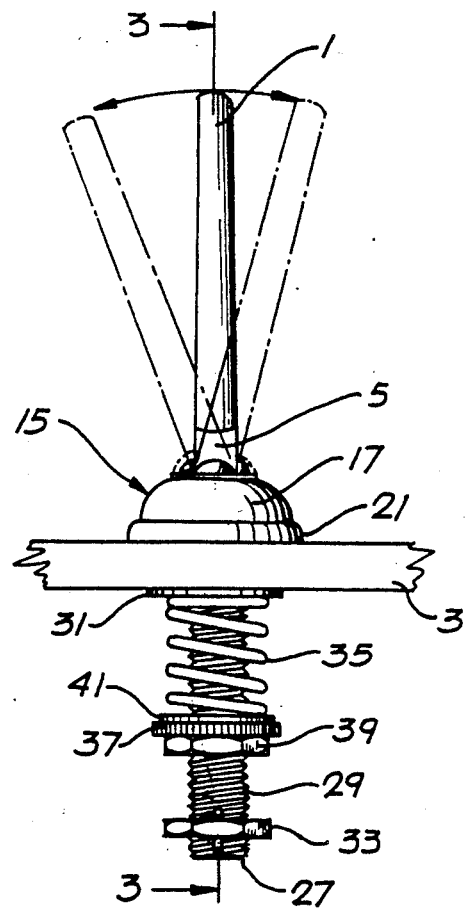
FIG. 2 is a side view of the embodiment shown in FIG. 1.
Figure 3:
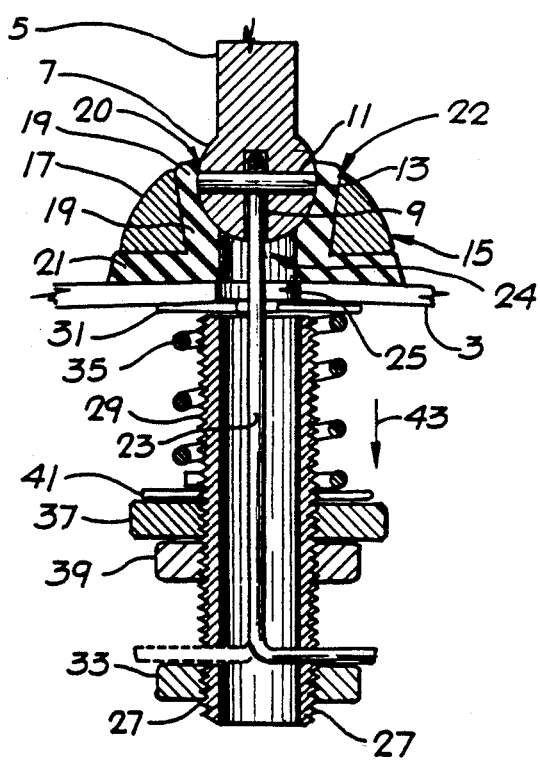
FIG. 3 is a cross-sectional front view taken along the line 3—3 of FIG. 2.

As shown in detail in FIGS. 2 and 3, the ornamental object 1 includes a stem 5 and a ball 7. The ball defines a slot 9 and a bore 11. A dowel pin 13, is frictionally engaged in the bore 11. The dowel pin 13 may be made of any material and preferably has a diameter between about 0.025 and about 0.085 inches. A dowel pin 13 made of hardened steel and 0.062 inches in diameter is currently in use. The ball 7 is received by a socket means 15, which is positioned on the exterior surface of the panel 3, about a hole 25. Hole 25 preferably has a diameter of between about 0.062 and about 0.5 inches, with 0.125 inches currently in use. In the embodiment shown in FIGS. 1–4, the socket means 15 includes a collar 17, a socket bushing 19, and a mounting bushing 21.

Figure 4:
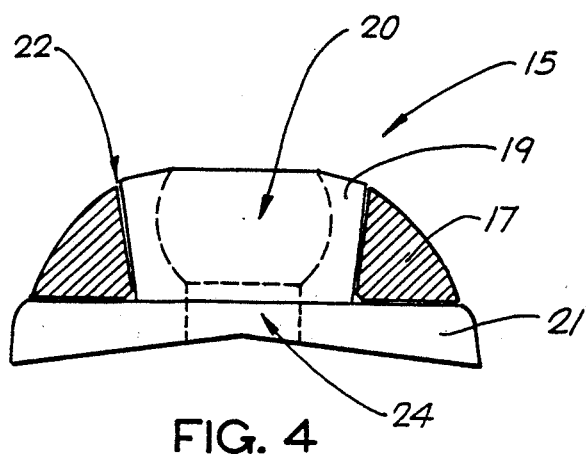
FIG. 4 is a sectional side view of the collar and bushing portion of the embodiment shown in FIG. 3.

The collar 17 preferably has a height of between about 0.125 and about 1.0 inches and a maximum radius of between about 0.250 and about 2.5 inches. Preferably, collar 17 is 0.250 inches high, has a maximum radius of 0.437 inches and is made of chrome-plated cast zinc. However, the collar may be made of plastic, copper, pewter, aluminum, stainless steel or other similar types of materials. As shown in FIG. 4, the collar 17 defines an opening 22 for receiving the socket/mounting bushing combination. The opening 22 has a dovetail cross-section, with the narrower portion located closer to the panel 3. The opening 22 preferably tapers at an angle between about 3 and about 20 degrees and has a maximum diameter of between about 0.250 and about 2.5 inches. Preferably the opening 22 tapers at approximately a 7 degree angle and has a maximum diameter of 0.520 inches. The mounting bushing 21 preferably has a diameter of between about 0.250 and about 2.5 inches, with 0.845 inches currently in use. The mounting bushing 21 preferably has an inverted V-shaped cross-section to securely engage the ridge commonly found on automobile hoods. Each leg of the inverted V preferably forms an angle of between about 3 and about 20 degrees with a horizontal axis. Currently an angle of 10 degrees is used. Although shown as having an inverter V-shaped cross-section, the mounting bushing 21 may be of other cross-sectional shapes to accommodate different hood surface undulations.

The mounting bushing 21 and the socket bushing 19 define a bore 24 which preferably has a diameter of between about 0.062 and about 0.250 inches. Currently, a diameter of 0.125 inches is used. The socket bushing 19 defines a socket 20 which receives the ball 7. The relative sizes of the socket 20 and ball 7 are chosen so that the socket bushing 19 will frictionally engage the ball 7 and hold the ball 7 in a selected mounting position. The radius of socket 20 is preferably between about 0.062 and about 0.500 inches and the radius of the ball 7 preferably is between about 0.062 and about 0.500 inches. Preferably the socket 20 has a radius of 0.187 inches and the ball 7 has a radius of 0.200 inches.

Preferably, the socket bushing 19 and the mounting bushing 21 are formed as a unit and are made of an elastomeric material. Exemplary of such elastomeric material are natural rubber, SBR, EPDM, neoprene, nitrile, urethane, silicone and viton. The preferred elastomeric material for formation of bushings 19 and 21 is EPDM having a durometer range of about 50 to about 90.

The socket bushing 19 preferably has a height of between about 0.250 and about 0.300 inches and tapers from a maximum diameter of between about 0.510 and about 0.5 inches to a minimum diameter of between about 0.470 and about 0.450 inches. Preferably, the socket bushing 19 has a height of 0.275 inches and tapers from a maximum diameter of 0.507 inches to a minimum diameter of 0.460 inches at the intersection of the socket bushing 19 and the mounting bushing 21.

A threaded sleeve 29 is aligned with the ball 7 and socket means 15 and is located on the opposite side of the panel 3 as the ball 7 and socket means 15. Preferably the threaded sleeve 29 is located on the interior side of the panel 3. Preferably, threaded sleeve 29 may be made of any durable material, have a length of between about 0.312 and about 3.0 inches, have an inner diameter of between about 0.125 and about 0.5 inches, and have an outer diameter of between about 0.187 and about 0.562 inches. In one embodiment, the threaded sleeve 29 is made of steel, is 1.50 inches long, has an inner diameter of 0.250 inches, and has an outer diameter of 0.375 inches. A washer 31 is positioned between the interior surface of panel 3 and the threaded sleeve 29.

A spring 35 is positioned about the threaded sleeve 29 between a finger nut 37 and the washer 31. The spring 35 preferably has a free length of between about 0.312 and about 3.0 inches, an inside diameter of between about 0.187 and about 0.562 inches, a wire diameter of between about 0.062 and about 0.250 inches, and between about 3 and about 10 coils. In one embodiment, spring 35 has a free length of 0.875 inches, an inside diameter of 0.400 inches, a wire diameter of 0.071 inches, and a total of 6.25 coils. In another embodiment, spring 35 has a free length of about 0.875 inches to about 1.00 inch, an inside diameter of about 0.410 to about 0.430 inches, a wire diameter of 0.095 inches, and 5 coils per each 0.875 inches of free length.

Washer 31 acts as a buffer between spring 35 and the interior surface of panel 3 and prevents frictional engagement of spring 35 and the interior surface of panel 3. The diameter of washer 31 is preferably greater than the diameter of hole 25 and greater than the diameter of the threaded sleeve 29. This allows the device to be used in applications where the hole 25 has a diameter greater than that of the threaded sleeve.

A first lock nut 39 is positioned to lock the Position of finger nut 37. Washer 41 is positioned about the threaded sleeve 29 between the spring 35 and the finger nut 37. Washer 41 acts as a buffer between spring 35 and finger nut 37 and prevents frictional engagement of spring 35 and finger nut 37. Preferably, both washer 41 and washer 31 are made of nylon. However, the washers 41, 31 may be made of other materials including, but not limited to, plastic or steel.

The ball means 7 is retained in the socket means 15 via retaining wire 23, which is looped around the dowel pin 13. The retaining wire preferably has a diameter of between about 0.015 and about 0.125 inches. Preferably, the retaining wire is tempered galvanized spring wire having a diameter of 0.041 inches. Both ends of the retaining wire 23 are passed through bore 24, hole 25 and nylon washer 31, and are engaged by retaining means shown in the form of slots 27 formed in the threaded sleeve 29, and a second lock nut 33. Slots 27 preferably have a length of between about 0.062 and about 0.500 inches and a width of between about 0.020 and about 0.140 inches. Preferably, slots 27 are both 0.045 inches wide and 0.280 inches long. Lock nut 33 is selectively positioned on the threaded sleeve 29 to maintain the retaining wire 23 in the slots 27. Preferably lock nuts 33, 39, and finger nut 37 are made of brass.

Figure 5B:
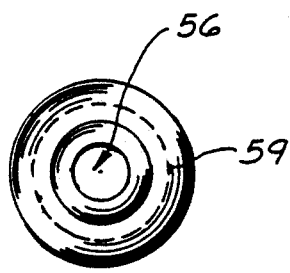
FIG. 5B is a top view of the retrofit bushing of FIG. 5A.
Figure 5A:
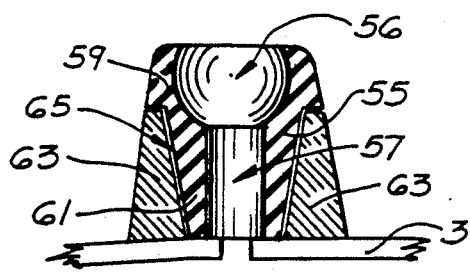
FIG. 5A is a sectional side view of a circular collar retrofit bushing used in an embodiment of the invention.

As shown in FIGS. 5A and 5B, the socket means 15 may also be a retrofit bushing 55. The retrofit bushing 55 includes a socket 56 for receiving the ball 7 of the ornamental object 1, and a bore 57 extending through the bushing 55. Preferably, socket 56 has a radius of between about 0.062 and about 0.500 inches and bore 57 has a radius of between about 0.062 and about 0.250 inches. Preferably the socket 56 has a radius of 0.187 inches to frictionally engage the ball 7 in the same manner as socket 20. In addition, like bore 24, bore 57 preferably has a radius of 0.125 inches. The bushing 55 also includes a collar portion 59 and a cylindrical portion 61. Preferably, collar portion 59 has a height of between about 0.062 and about 0.750 inches and cylindrical portion 61 has a length of between about 0.062 and about 1.00 inches. Preferably, collar portion 59 is 0.220 inches high and formed as a single unit with cylindrical portion 61, which is preferably 0.405 inches long. The cylindrical portion 61 preferably is tapered at an angle between about 3 and about 25 degrees. Currently, a taper angle of 10 degrees is in use.

The retrofit bushing 55 may be inserted in an O.E.M. manufacturer's mounting base 63. The cylindrical portion of the retrofit bushing 55 fits within an aperture 65 in the mounting base. Because of its tapered shape, the cylindrical portion 61 can be inserted in apertures of various shapes and sizes. The bushing 55 is made of an elastomeric material, such as natural rubber, SBR, EPDM, neoprene, nitrile, urethane, silicone and vitor. Preferably the bushing 55 is made of EPDM having a durometer range of from about 50 to about 90, which also allows the cylindrical portion 61 to be inserted in apertures of various shapes and sizes. The bushing 55 acts to grip the ball 7 of the ornamental object 1 when the ball is received by the socket 56.

Figure 6:
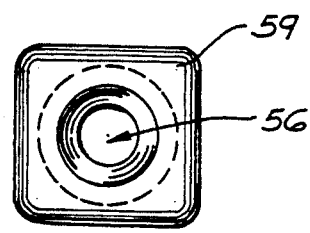
FIG. 6 is a top view of a retrofit bushing having a square collar.
Figure 7:
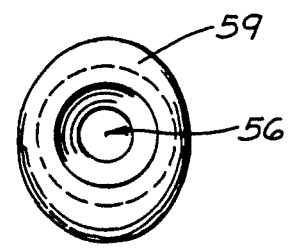
FIG. 7 is a top view of a retrofit bushing having an oblong collar.

The collar portion 59 may be one of a variety of shapes, such as circular as shown in FIG. 5B or square, as shown in FIG. 6, or oval, as shown in FIG. 7, or any other shape that will allow the bushing to fit into a preexisting manufacturer's mounting base in an aesthetically pleasing manner. In one embodiment a circular collar has a diameter of 0.562 inches. In a second embodiment, a square collar has a side length of 0.562 inches. In a third embodiment, an oval collar has a major radius of 0.6875 inches and a minor radius of 0.562 inches.

Turning now to the operation of the mounting device, as shown in FIG. 3, the spring 35 produces a force in the direction indicated by the arrow 43. This force is transmitted to the threaded sleeve 29 via washer 41 and finger nut 37. The threaded sleeve 29 is forced in the direction of the arrow 43, thus forcing the retaining wire 23 in the same direction. The retaining wire 23, in turn, forces the ball 7, via the dowel pin 13, into engagement with the socket means 15. The force produced by the spring 35 may be controlled by selectively positioning the finger nut 37. As the finger nut 37 is positioned closer to the panel 3, the spring 35 will become more compressed and the resulting force will increase. As the finger nut 37 is positioned farther from the panel 3, the spring 35 will become less compressed and the resulting force will decrease.

In the embodiment shown in FIG. 3, when the ball 7 is forced into the socket means 15, socket 20 receives the ball 7 and socket bushing 19 frictionally engages, or grips, the ball 7. The frictional engagement occurs due to the resiliency of the socket bushing 19 and because, as the ball 7 is forced closer to the panel 3, the dovetail cross-section of the collar 17 acts to force the socket bushing 19 against the ball 7. Due to the frictional engagement of the ball 7 with the socket bushing 19, the position of the ornamental object 1, including its angle of inclination, is fixed.

In the embodiment shown in FIGS. 5A and 5B, when the ball 7 is forced into the socket means 15, socket 56 receives the ball 7 and the retrofit bushing 55 frictionally engages, or grips, the ball 7. Thus, in this embodiment the position of the ornamental object 1, including its angle of inclination, is also fixed.

Although the ornamental object 1 is fixably mounted by the frictional engagement of the ball 7 and the socket bushing 19 or the retrofit bushing 56, it may still be moved if impacted with a strong force. Thus, any damage or injury due to such an impact is reduced. However, in normal operation, the ornamental object 1 remains fixed in the mounting position chosen.

As shown in FIG. 2, the ornamental object 1 may be mounted in a plurality of positions, including a Plurality of angles of inclination; thus accommodating a variety of hood slope angles. This may be accomplished by exerting a force on the wire 23 in a direction opposite to that shown by the arrow 43. When this force exceeds the force created by the spring 35, the ball means 7 will become disengaged from the socket means 15 and the position of the ornamental object may be adjusted. The threaded sleeve 29 is freely rotatable and therefore, the ornamental object 1 may be rotated about an axis defined by the threaded sleeve 29. In addition, due to the interaction of the retaining wire 23 and the dowel pin 13, the ornamental object 1 is free to rotate about an axis defined by the dowel pin 13. Thus, the position of the ornamental object 1 may be selected from a plurality of positions in two planes. Once the position of the ornamental object 1 has been selected, the disengaging force may be released and the ball 7 will again be forced into engagement with the socket means 15.

Figure 8:
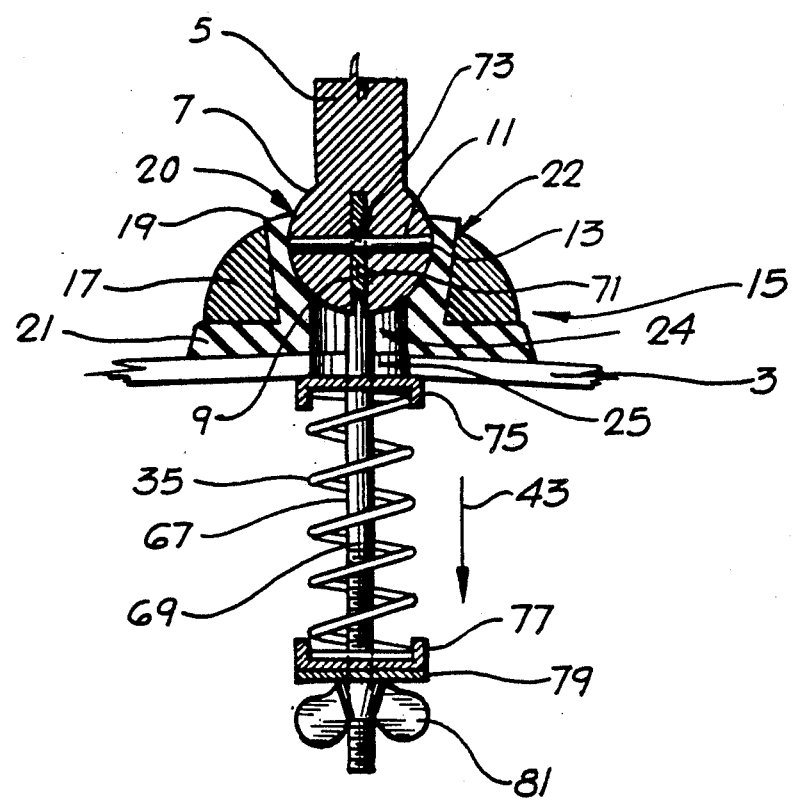
FIG. 8 is a cross-sectional view of another embodiment of the invention.

FIG. 8 Shows another embodiment of the invention. This embodiment includes a partially threaded rod 67 having a cylindrical portion 69 and a flat portion 71 which has an opening 73 for loosely receiving dowel pin 13. The flat portion 71 is loosely received by slot 9, such that the ball 7 is free to rotate about an axis defined by the dowel pin 13.

Spring 35 is positioned about the rod 67 between two washers 75, 77, each having a stand-up stopper to prevent the spring 35 from moving in a direction perpendicular to the rod 67. Washers having stand-up stoppers may also be used in the other previously described embodiments of the invention to limit the movement of the spring 35. Washer 79 acts as a buffer between washer 77 and a wing nut 81, which engages the threaded portion of the rod 67.

Preferably, the partially threaded rod 67 is made of steel, however, other rigid materials may be used. The cylindrical portion 69 of the rod 67 has a Preferred length of between about 0.750 and about 2.00 inches. A length of 1.250 inches has been chosen for one embodiment. The cylindrical portion 69 of the rod 67 preferably has a diameter of between about 0.125 inches and about 0.500 inches.

In operation, the embodiment shown in FIG. 8 works in a manner similar to the previously described embodiments. The spring 35 produces a force in the direction indicated by arrow 43. This force is transmitted to the partially threaded rod 67 via washers 77,79 and wing nut 81. The rod 67 is forced in the direction of the arrow 43, thus forcing the ball 7, via dowel pin 13, into engagement with the socket means 15. The force produced by the spring 35 may be controlled by selectively positioning the wing nut 81. As the wing nut 81 is positioned closer to the panel3, the spring 35 will become more compressed and the resulting force will increase. As the wing nut 81 is positioned father from the panel 3, the spring 35 will become less compressed and the resulting force will decrease.

Of course, it should be understood that various changes and modifications to the preferred embodiment described herein will be apparent to those skilled in the art. For example, measurements or ranges of measurements for elements or characteristics are meant to be preferred and should not be construed as limiting the invention to such measurements or range of measurements. Such changes and modifications can be made without departing from the scope of the present invention and without diminishing its attendant advantages. It is, therefore, intended that such changes and modifications be covered by the following claims.

We claim:

1. A device for mounting an ornamental object to a panel of a vehicle comprising:
   an ornamental object including a ball;
   socket means for receiving said ball, said socket means mounted on said panel of said vehicle;
   means for resiliently retaining said ball in said socket means;
   wherein said ornamental object may be mounted in a plurality of positions.

2. The device of claim 1 wherein said panel defines a hole, a first surface on a first side and a second surface on a second side;
   wherein said ball and said socket means are located on said first surface; and
   wherein said resilient retaining means includes:
      a retaining wire having first, second and third segments, said first segment attached to said ball;
      a sleeve defining first and second slots for receiving said second and said third segments of said retaining wire, said sleeve positioned on said second side;
      spring means, positioned about said sleeve, for producing a force on said second and third portions of said retaining wire, said force directed away from said panel; and
      means for adjusting said force produced by said spring means.

3. The device of claim 1 wherein said panel defines a hole, a first surface on a first side and a second surface on a second side;
   wherein said ball and said socket means are located on said first surface; and
   wherein said resilient retaining means includes:
      a rod rotatably attached to said ball;
      spring means, positioned about said rod, for producing a force on said rod, said force directed away from said panel; and
      means for adjusting said force produced by said spring means.

4. The device of claim 1 wherein said socket means includes bushing means for frictionally engaging said ball.

5. The device of claim 4 wherein said bushing means includes a socket bushing defining a socket for receiving said ball and a mounting bushing for engaging said panel.

6. The device of claim 5 wherein said socket bushing and said mounting bushing are integral and made of an elastomeric material.

7. The device of claim 4 further comprising a mounting base for receiving said bushing means.

8. The device of claim 7 wherein said mounting base includes a collar defining an opening for receiving said bushing means.

9. The device of claim 8 wherein said opening has a dovetail cross-section.

10. The device of claim 2 further comprising washer means, located between said second surface and said spring means, for reducing friction between said second surface and said spring means.

11. The device of claim 3 further comprising washer means, located between said second surface and said spring means, for reducing friction between said second surface and said spring menas.

12. A device for mounting an ornamental object to a panel of a vehicle comprising:
   an ornamental object including a ball;
   socket means for receiving said ball, said socket means mounted on said panel of said vehicle;
   means for resiliently retaining said ball in said socket means;
   wherein said ornamental object may be mounted in a plurality of positions of differing inclination angles thus accommodating a variety of panels having varying slope angles.

13. The device of claim 12 wherein said panel defines a hole, a first surface on a first side and a second surface on a second side;
   wherein said ball and said socket means are located on said first surface; and
   wherein said resilient retaining means includes:
      a retaining wire having first, second and third segments, said first segment attached to said ball;
      a sleeve defining first and second slots for receiving said second and said third segments of said retaining wire, said sleeve positioned on said second side;
      spring means, positioned about said sleeve, for producing a force on said second and third portions of said retaining wire, said force directed away from said panel; and
      means for adjusting said force produced by said spring means.

14. The device of claim 12 wherein said panel defines a hole, a first surface on a first side and a second surface on a second side;
   wherein said ball and said socket means are located on said first surface; and
   wherein said resilient retaining means includes:
      a rod rotatably attached to said ball;
      spring means, positioned about said rod, for producing a force on said rod, said force directed away from said panel; and means for adjusting said force produced by said spring menas.

15. The device of claim 12 wherein said socket means includes bushing means for frictionally engaging said ball.

16. The device of claim 13 wherein said bushing means includes a socket bushing defining a socket for receiving said ball and a mounting bushing for engaging said panel.

17. The device of claim 16 wherein said socket bushing and said mounting bushing are integral and made of an elastomeric material.

18. The device of claim 13 further comprising a mounting base for receiving said bushing means.

19. The device of claim 18 wherein said mounting base includes a collar defining an opening for receiving said bushing means.

20. The device of claim 18 wherein said opening has a dovetail cross-section.

21. The device of claim 13 further comprising washer means, located between said second surface and said spring means, for reducing friction between said second surface and said spring means.

22. The device of claim 14 further comprising washer means, located between said second surface and said spring means, for reducing friction between said second surface and said spring means.

23. A device for mounting an ornamental object to a panel of a vehicle, said panel defining a hole, a first surface on a first side, and a second surface on a second side, said device comprising:
   an ornamental object including a stem and a ball integral with said stem;
   a bushing defining a socket for frictionally gripping said ball;
   a mounting base positioned on said first surface of said panel, said mounting base defining an opening for receiving said bushing;
   a retaining wire defining first, second and third segments, said first segment attached to said ball;
   a sleeve located on said second side of said panel, said sleeve defining first and second slots for receiving said second and said third segments of said retaining wire;
   a spring positioned about said sleeve, said spring producing a force on said second and third portions of said retaining wire, said force directed away from said panel;
   means for adjusting the compression of said spring to thereby adjust the magnitude of said force produced by said spring;
   wherein said force produced by said spring pulls said ball into engagement with said socket; and
   wherein said ornament may be mounted in a plurality of positions of differing inclination angles, thus accommodating a variety of panel slope angles.

24. A device for mounting an ornamental object to a panel of a vehicle, said panel defining a hole, a first surface on a first side, and a second surface on a second side, said device comprising:
   an ornamental object including a stem and a ball integral with said stem;
   a bushinq defininq a socket for frictionally gripping said ball;
   a mounting base positioned on said first surface of said panel, said mounting base defining an opening for receiving said bushing;
   a rod rotatably attached to said ball and extending through said hole;
   a spring positioned about said rod, said spring producing a force on said rod, said force directed away from said panel;
   means for adjusting the compression of said spring to thereby adjust the magnitude of said force produced by said spring;
   wherein said force produced by said spring pulls said ball into engagement with said socket; and
   wherein said ornament may be mounted in a plurality of positions of differing inclination angles, thus accommodating a variety of panel slope angles.

* * * * *